US008950987B2

(12) United States Patent
Okada et al.

(10) Patent No.: US 8,950,987 B2
(45) Date of Patent: Feb. 10, 2015

(54) METHOD OF BORING WORK BY 5-AXIS MACHINING DOUBLE-HOUSING MACHINE TOOL AND 5-AXIS MACHINING DOUBLE-HOUSING MACHINE TOOL

(75) Inventors: Satoshi Okada, Niwa-gun (JP); Masazumi Nakanishi, Niwa-gun (JP); Kazuki Uemura, Niwa-gun (JP); Yasushi Manabe, Niwa-gun (JP); Yuji Kuramochi, Niwa-gun (JP)

(73) Assignee: Yamazaki Mazak Corporation, Niwa-Gun, Aichi Pref. (JP)

( * ) Notice: Subject to any disclaimer, the term of this patent is extended or adjusted under 35 U.S.C. 154(b) by 739 days.

(21) Appl. No.: 13/128,187

(22) PCT Filed: Aug. 31, 2009

(86) PCT No.: PCT/JP2009/065183
§ 371 (c)(1),
(2), (4) Date: May 6, 2011

(87) PCT Pub. No.: WO2010/064478
PCT Pub. Date: Jun. 10, 2010

(65) Prior Publication Data
US 2011/0243680 A1 Oct. 6, 2011

(30) Foreign Application Priority Data

Dec. 2, 2008 (JP) ................................. 2008-307777

(51) Int. Cl.
*B23C 1/12* (2006.01)
*B23Q 1/54* (2006.01)
(Continued)

(52) U.S. Cl.
CPC .............. *B23Q 1/5406* (2013.01); *B23B 35/00* (2013.01); *B23B 39/00* (2013.01); *B23Q 2220/006* (2013.01)
USPC ........... 409/132; 409/201; 409/212; 409/216; 409/202; 409/211

(58) Field of Classification Search
CPC .. B23Q 2220/006; B23Q 1/0009; B23Q 1/70; B23Q 2220/008; B23Q 1/0027; B23B 35/00; B23B 39/00; G05B 2219/49344; G05B 2219/49121; G05B 19/18
USPC .................. 409/132, 201, 212, 216, 202, 211
See application file for complete search history.

(56) References Cited

U.S. PATENT DOCUMENTS 3,460,435 A * 8/1969 Dahl et al. ..................... 409/183
5,584,621 A * 12/1996 Bertsche et al. .............. 409/201
(Continued)

FOREIGN PATENT DOCUMENTS

CN   200954556 Y   10/2007
JP   58-028408 A    2/1983
(Continued)

OTHER PUBLICATIONS

European Search Report of International Application No. PCT/JP2009/065183.
(Continued)

*Primary Examiner* — Eric A Gates
*Assistant Examiner* — Paul M Janeski
(74) *Attorney, Agent, or Firm* — Marsh Fischmann & Breyfogle LLP; Jonathon A. Szumny

(57) ABSTRACT

A slip ring is accommodated in a ram 34. The slip ring includes a fixed portion 72 having a feed element connected to a power source and a movable portion 73 electrically connected to the feed element. The movable portion 73 includes a contact 75 for supplying electricity to a spindle unit 100 and an electric device of a spindle head 118. After determining the position of a saddle 32 in a Y-axis direction and the position of a table in an X-axis direction, the position of the spindle head 118 about a B-axis is determined. Then, the ram 34 is moved along the Z-axis direction with the spindle unit 100 revolved about the C-axis, and, with a non-rotational cutting tool 170 attached to the spindle unit 100, a hole is bored in a workpiece W on the table.

5 Claims, 13 Drawing Sheets

(51) Int. Cl.
  *B23B 35/00* (2006.01)
  *B23B 39/00* (2006.01)

(56) References Cited

U.S. PATENT DOCUMENTS

| | | | |
|---|---|---|---|
| 6,352,496 B1* | 3/2002 | Oldani | 483/55 |
| 6,474,913 B2* | 11/2002 | Katoh et al. | 409/131 |
| 6,540,454 B2* | 4/2003 | Tanaka et al. | 409/131 |
| 7,134,173 B2* | 11/2006 | Gstir et al. | 29/27 C |
| 7,255,519 B2* | 8/2007 | Tanoue et al. | 409/134 |
| 7,293,337 B2* | 11/2007 | Hosoe | 29/28 |
| 7,357,769 B2* | 4/2008 | Takayama et al. | 483/41 |
| 7,384,224 B2* | 6/2008 | Ferrari | 409/212 |
| 7,500,297 B2* | 3/2009 | Okada et al. | 29/27 C |
| 7,506,423 B2* | 3/2009 | Iwabuchi et al. | 29/27 C |
| 7,938,603 B2* | 5/2011 | Tatsuda et al. | 409/216 |
| 7,969,111 B2* | 6/2011 | Otsuki et al. | 318/572 |
| 8,197,164 B2* | 6/2012 | Tatsuda | 409/201 |
| 8,260,453 B2* | 9/2012 | Otsuki et al. | 700/189 |
| 8,519,587 B2* | 8/2013 | Tatsuda | 310/112 |
| 8,641,338 B2* | 2/2014 | Yoneyama et al. | 409/135 |
| 2002/0190103 A1* | 12/2002 | Yoshinaga | 228/112.1 |
| 2006/0018725 A1* | 1/2006 | Ichino et al. | 409/131 |
| 2006/0283292 A1 | 12/2006 | Iwabuchi et al. | |
| 2009/0140684 A1* | 6/2009 | Otsuki et al. | 318/572 |
| 2012/0121356 A1 | 5/2012 | Tatsuda | |

FOREIGN PATENT DOCUMENTS

| | | |
|---|---|---|
| JP | 6-5801 U | 1/1994 |
| JP | 7-1206 A | 1/1995 |
| JP | 2008-073839 | 4/2008 |
| JP | 2008-272889 A | 11/2008 |
| WO | WO2008/050747 A1 | 5/2008 |

OTHER PUBLICATIONS

International Preliminary Report on Patentability (PCT/IB373), of International Application No. PCT/JP2009/065183.

* cited by examiner

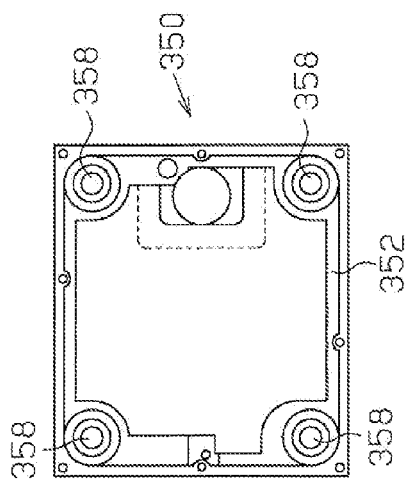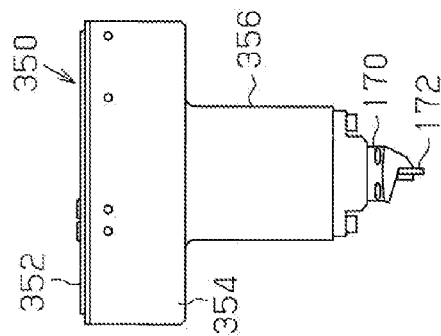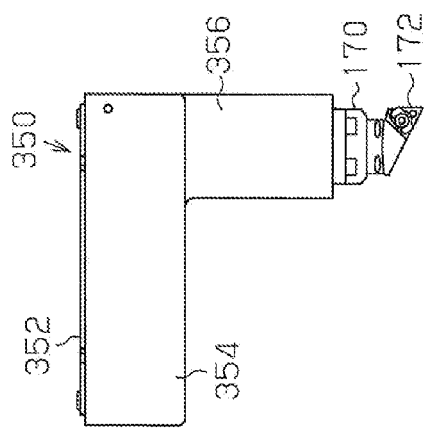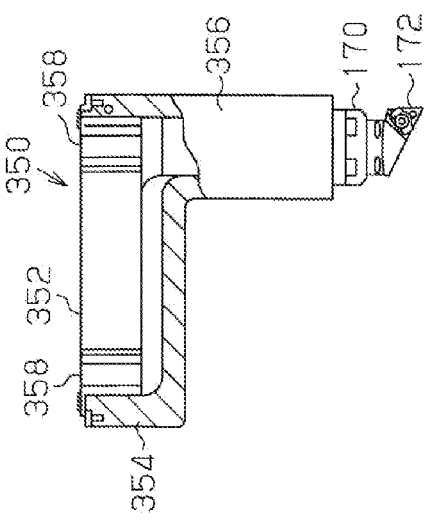

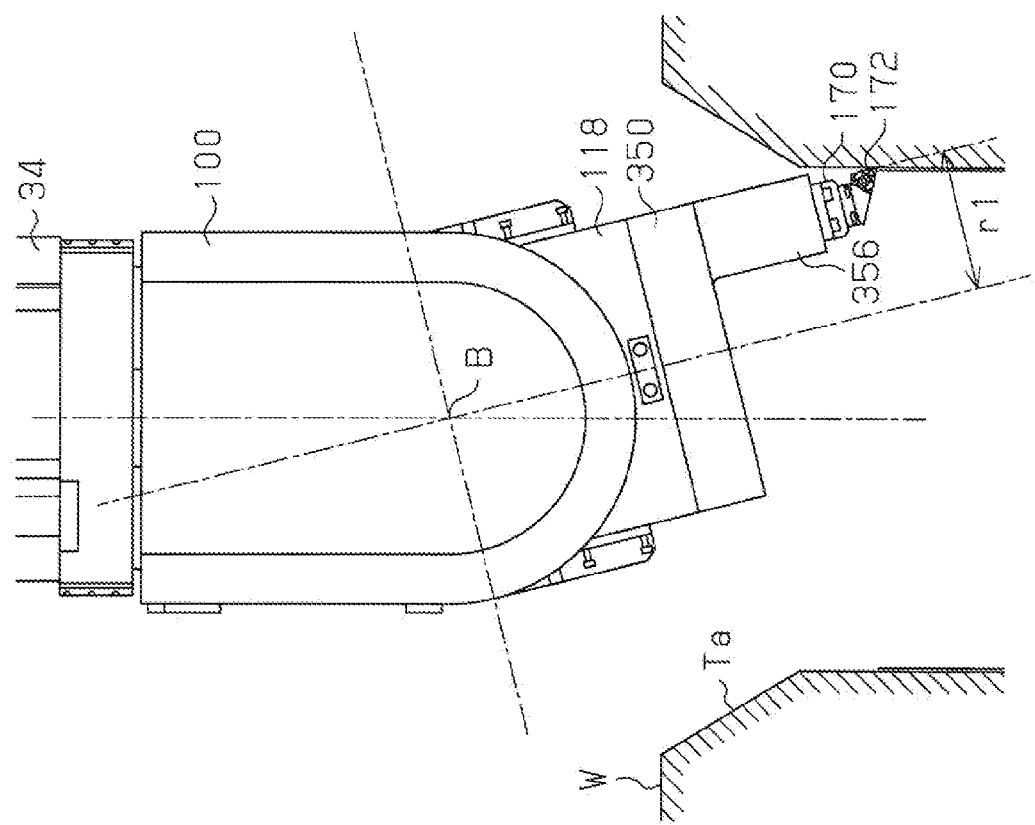

METHOD OF BORING WORK BY 5-AXIS MACHINING DOUBLE-HOUSING MACHINE TOOL AND 5-AXIS MACHINING DOUBLE-HOUSING MACHINE TOOL

FIELD OF THE INVENTION

The present invention relates to a method of workpiece boring by a 5-axis machining double-housing machine tool and to a 5-axis machining double-housing machine tool.

BACKGROUND OF THE INVENTION

Conventionally, when a large workpiece is turned, a large-sized lathe is generally used. However, if the workpiece is not in good balance, the rotation rate of the workpiece is limited. This requires a great reduction in the cutting speed conditions such as the feed rate. To deal with this drawback, a counterweight may be attached to the workpiece so as to improve the balance. However, this countermeasure increases the energy consumption due to the addition of the counterweight when the workpiece is rotated, and limits the weight of the workpiece.

Hereinafter, a prior art technique for turning a large workpiece will be described.

A workpiece W shown in FIG. 12 is a large workpiece having a weight of 1160 kg. The machining diameter of a hole Wa to be formed through boring is 730 mm.

When the workpiece W is machined by being revolved about a center O1, which is displaced from the center of gravity O of the workpiece W, the maximum diameter of the swing of the workpiece W is 2330 mm as shown in FIG. 12 (the radius from the center O1 being 1165 mm). In the example of this workpiece W, since the center of gravity O is at the position of 237 mm away from the revolution center, the rotation of the workpiece W is imbalanced.

To perform such machining, a significantly large vertical lathe is necessary. In other words, the turning of the workpiece W needs to be performed by a different large vertical lathe, which significantly extends the overall machining time.

Accordingly, to avoid such a turning process, circularity machining is performed as shown in FIG. 13. The circularity machining refers to a process in which a workpiece W fixed onto a table is moved along a hole Wa while an end mill is rotated. The circularity machining allows machining of other parts of the workpiece W to be performed with the same machine tool. However, the machining accuracy of the circularity machining is inferior to that of a turning process.

As described above, conventionally, a large workpiece that is difficult to rotate is machined in the following manner. That is, such a workpiece is subjected to the circularity machining by an end mill, which sacrifices machining accuracy and machined surface. The workpiece is also subjected to a turning process using a horizontal boring machine, or a boring process performed by rotating the workpiece with a large vertical lathe in the knowledge of a resultant imbalance. In other words, machining processes are switched, which requires setup of workpiece and tools each time.

Patent Document 1 discloses boring by a horizontal boring machine.

PRIOR ART DOCUMENTS

Patent Document

Patent Document 1: Japanese Laid-Open Patent Publication No. 58-28408

SUMMARY OF THE INVENTION

Accordingly, it is an objective of the present invention to provide a method of workpiece boring by a 5-axis machining double-housing machine tool and a 5-axis machining double-housing machine tool that eliminate the necessity for changeovers without sacrificing machining accuracy and machined surfaces, in other words, a method and a machine tool that are capable of machining a large workpiece that is fixed to a table.

To achieve the foregoing objective, a method of workpiece boring by a 5-axis machining double-housing machine tool is provided. The machine tool includes: a table and a double-housing column that are movable relative to each other along an X-axis extending horizontally; a cross rail that is either fixed on a Z-axis or movable upward and downward along the Z-axis, the Z-axis extending vertically along the column; a saddle that is movable along a Y-axis extending on the cross rail along a horizontal direction; a ram supported to the saddle to be movable upward and downward along the Z-axis; a spindle unit that is attached to a lower end of the ram to be revolvable about a C-axis, which is an axis of the ram; and a spindle head that is attached to the spindle unit to be revolvable about a B-axis, which is perpendicular to the C-axis. The method further includes, after determining the position of the saddle in the Y-axis direction and the position of the table in the X-axis direction, moving the ram along the Z-axis direction with the spindle unit revolved about the C-axis; and, with a non-rotational cutting tool attached to the spindle head, boring a hole in a workpiece on the table, the machining diameter of the hole being determined by the position about the B-axis of the spindle head.

In accordance with this configuration, the 5-axis machining double-housing machine tool performs boring by revolving a spindle unit about the C-axis, which allows the workpiece to be performed turning while being fixed. Thus, highly accurate and high quality boring of large workpieces is possible without a changeover to another specialized machine tool to avoid imbalance of the workpiece. Also, the machining diameter of the hole can be changed by adjusting the position of the spindle head about the B-axis. Thus, unlike a boring process with a constant machining diameter, holes of different diameters can be formed by changing the program.

While the ram is being moved along the Z-axis direction, the spindle head is preferably rotated about the B-axis to change the machining diameter of the workpiece.

According to this configuration, unlike a boring process with a constant machining diameter, the machining diameter of the hole can be easily changed by changing the program, allowing holes of various shapes, for example, tapered shapes, to be formed.

When the machining diameter of the workpiece is changed by rotating the spindle head about the B-axis while the ram is being moved along the Z-axis direction, the movement amount of the ram along the Z-axis direction is preferably corrected in accordance with the movement amount of a cutting tip of the non-rotational cutting tool along the Z-axis direction when the spindle head is rotated about the B-axis.

According to this configuration, the spindle head can be adequately moved along the Z-axis.

A 5-axis machining double-housing machine tool according to the present invention includes: a table and a double-housing column that are movable relative to each other along an X-axis extending horizontally; a cross rail that is either fixed on a Z-axis or movable upward and downward along the Z-axis, the Z-axis extending vertically along the column; a saddle that is movable along a Y-axis extending on the cross rail along a horizontal direction; a ram supported to the saddle to be movable upward and downward along the Z-axis; a spindle unit that is attached to a lower end of the ram to be revolvable about a C-axis, which is an axis of the ram; and a spindle head that is attached to the spindle unit to be revolvable about a B-axis, which is perpendicular to the C-axis. A slip ring is accommodated in the ram. The slip ring includes a fixed portion having a feed element connected to a power source and a movable portion electrically connected to the feed element. The movable portion includes a contact for supplying electricity to the spindle unit and an electric device of the spindle head. The movable portion is pivotable about the C-axis by 360 degrees or more. The spindle head has a non-rotational cutting tool.

This configuration provides a 5-axis machining double-housing machine tool that can be directly used for the above described method of workpiece boring by a 5-axis machining double-housing machine tool.

A 5-axis machining double-housing machine tool according to the present invention includes: a table and a double-housing column that are movable relative to each other along an X-axis extending horizontally; a cross rail that is either fixed on a Z-axis or movable upward and downward along the Z-axis, the Z-axis extending vertically along the column; a saddle that is movable along a Y-axis extending on the cross rail along a horizontal direction; a ram supported to the saddle to be movable upward and downward along the Z-axis; a spindle unit that is attached to a lower end of the ram to be revolvable about a C-axis, which is an axis of the ram; and a spindle head that is attached to the spindle unit to be revolvable about a B-axis, which is perpendicular to the C-axis. A slip ring is accommodated in the ram. The slip ring includes a fixed portion having a feed element connected to a power source and a movable portion electrically connected to the feed element. The movable portion includes a contact for supplying electricity to the spindle unit and an electric device of the spindle head. The movable portion is pivotable about the C-axis by 360 degrees or more. An attachment is removably attached to an end of the spindle head, and a non-rotational cutting tool is provided in the attachment.

This configuration provides a 5-axis machining double-housing machine tool that can be directly used for the above described method of workpiece boring by a 5-axis machining double-housing machine tool.

BRIEF DESCRIPTION OF THE DRAWINGS

FIG. 10(a) is a plan view showing an attachment;

FIG. 10(b) is a cross-sectional view showing the attachment;

FIG. 10(c) is a front view showing the attachment;

FIG. 10(d) is a side view showing the attachment;

FIG. 11 is a diagram showing operation of the machining center;

DETAILED DESCRIPTION OF THE PREFERRED EMBODIMENTS

A 5-axis machining double-housing machine tool according to the present invention, which is a machining center 20 according to one embodiment, will now be described with reference to FIGS. 1 to 7.

Figure 1:
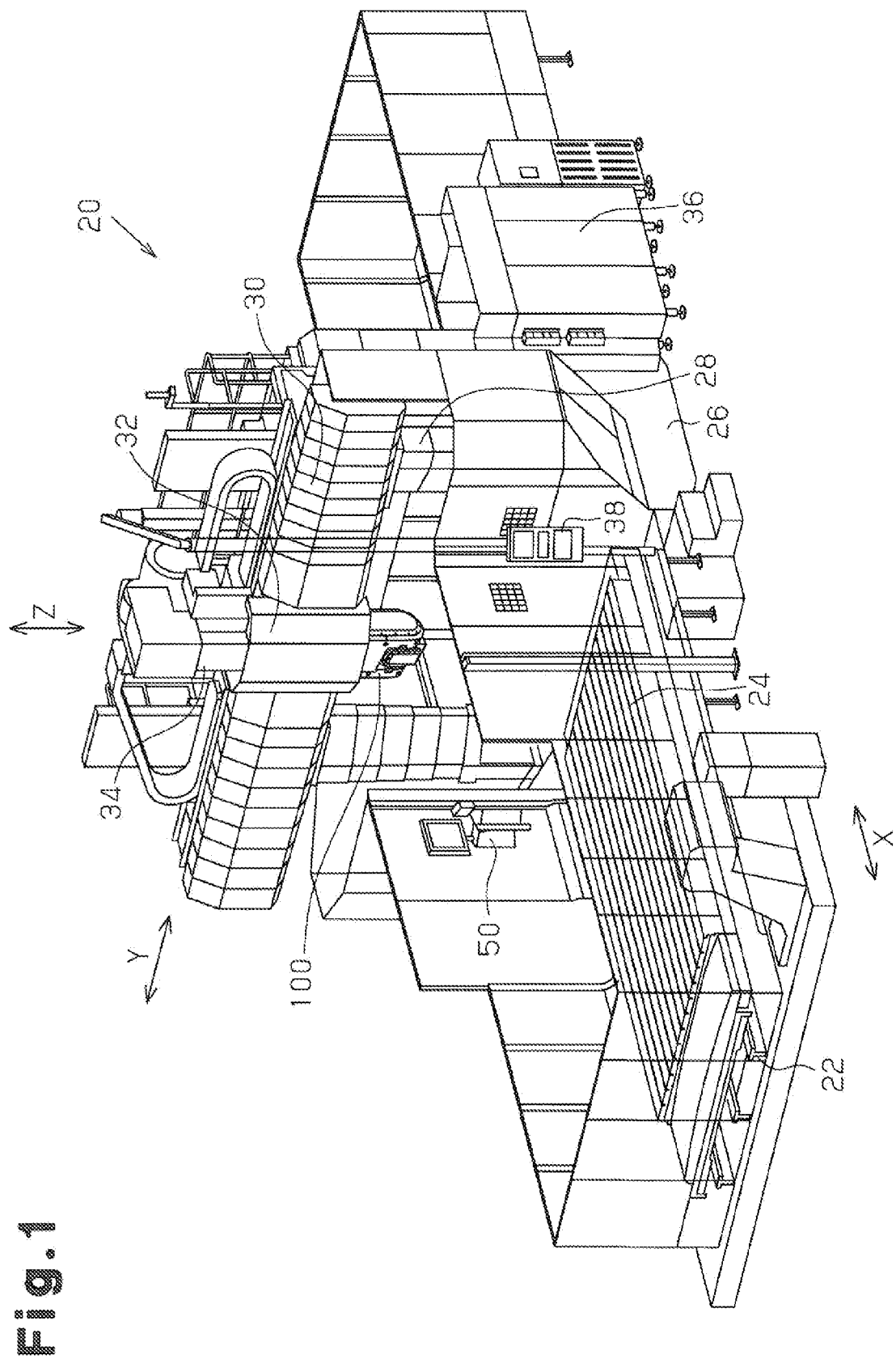
FIG. 1 is a schematic front perspective view illustrating a multi-face 5-axis machining double-housing machining center according to one embodiment of the present invention.

As shown in FIG. 1, the machining center 20 includes a table 24 arranged on a base 22. The table 24 is actuated by an X-axis drive motor Mx shown in FIG. 7, so as to move along an X-axis, which is the lateral and longitudinal direction of the table 24, with a workpiece W mounted thereon.

A double-housing column 28 extends upward from a column base 26. The column 28 has a cross rail 30. The cross rail 30 is guided by the column 28, and actuated by a W-axis drive motor Mw shown in FIG. 7, so as to move upward and downward along a W-axis, which is the same direction as a Z-axis direction extending vertically. A saddle 32 is arranged on the cross rail 30. The saddle 32 is movable along a Y-axis, which extends horizontally, by a ball screw (not shown) actuated by a Y-axis drive motor My shown in FIG. 7. A ram 34 is attached to the saddle 32 so as to be moved upward and downward by a ball screw (not shown) actuated by a Z-axis drive motor Mz. A spindle unit 100 is provided at the lower end of the ram 34.

An automatic tool changer (ATC) unit 50 is arranged on one side of the double-housing column 28. Devices such as a control unit 36 and a main console panel 38 manipulated by an operator are arranged in the vicinity of the base 22.

Figure 2:
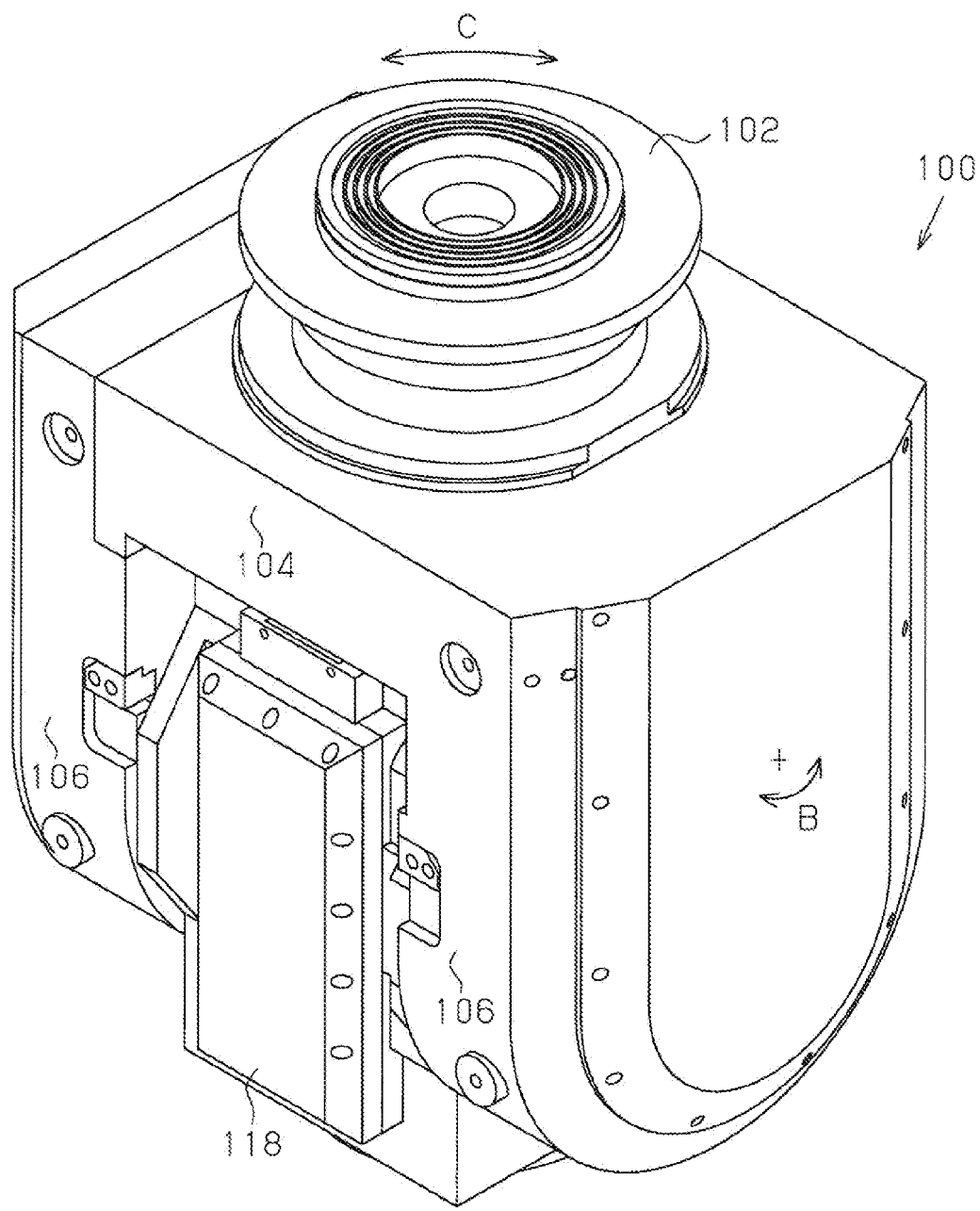
FIG. 2 is a perspective view showing the appearance of the spindle unit.
Figure 4:
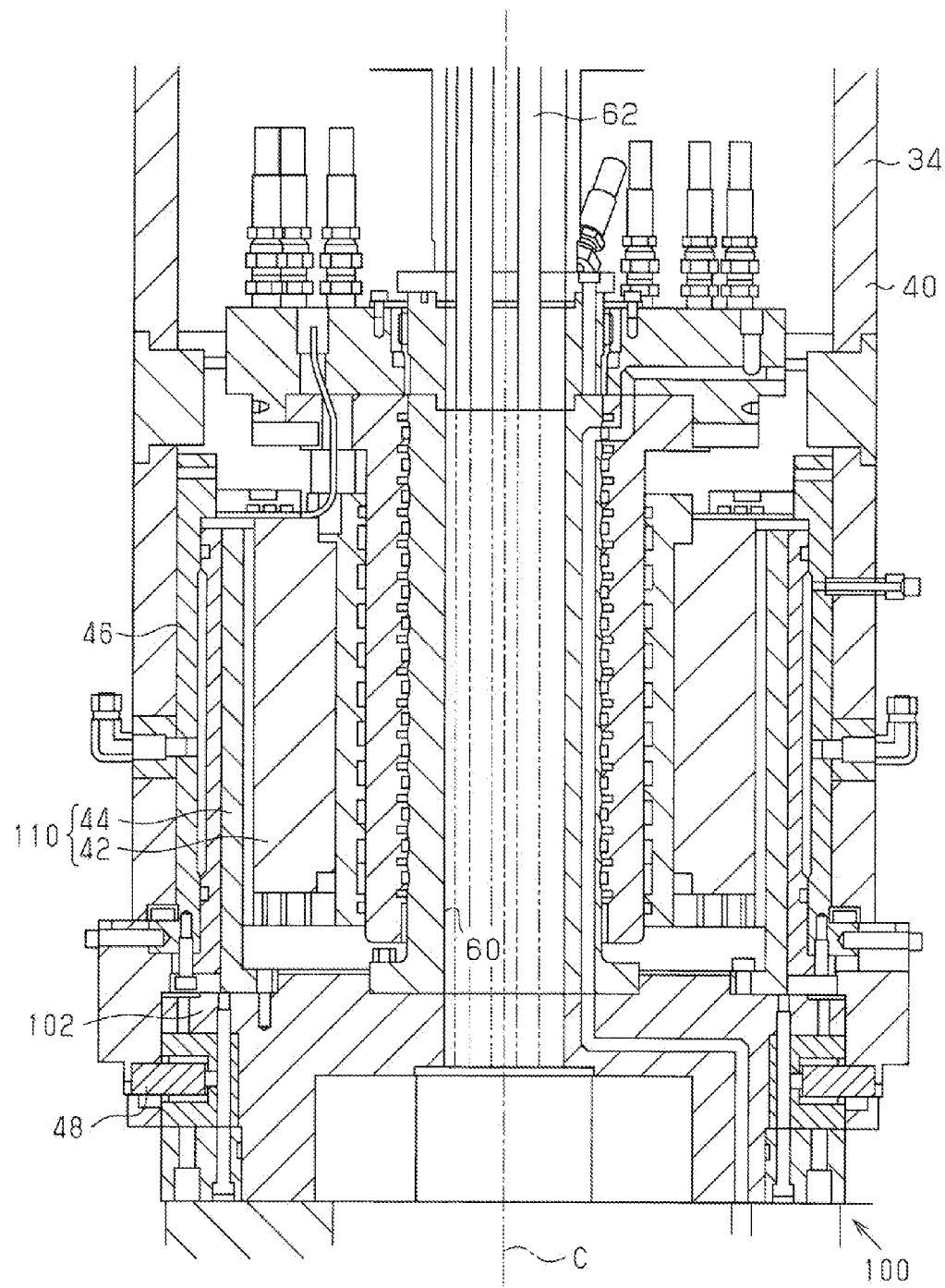
FIG. 4 is a partial cross-sectional view showing the ram.

As shown in FIG. 2, a spindle unit 100 has an attachment flange 102 for being attached to the lower end of the ram 34, and a housing 104 integrated with the attachment flange 102. As shown in FIG. 4, the attachment flange 102 is attached to the spindle unit 100 to be rotatable about a C-axis via a bearing 48. The ram 34 accommodates a C-axis drive motor 110, which is formed by a stator 42 fixed to a case 40 as shown in FIG. 4, and a rotor 44 fixed to the attachment flange 102. The spindle unit 100 is actuated by the C-axis drive motor 110 to be revolved about the C-axis, which is the axis of the ram 34. A hydraulic brake 46 is provided between the rotor 44 and the case 40. The hydraulic brake 46 is capable of stopping the rotating rotor 44 and holding the rotor 44.

As shown in FIG. 4, a rotation pipe 60 is integrally fixed to an upper center of the attachment flange 102. The rotation pipe 60 extends through the stator 42 as shown in FIG. 4 and is integrally rotatable with the attachment flange 102 about the C-axis of the spindle unit 100. A plurality of power wires 62 formed by electric wires or busbars are inserted in the rotation pipe 60. Each power wire 62 in the rotation pipe 60 supplies electricity to various types of electric devices in the spindle unit 100, such as a B-axis drive motor 156 and a spindle motor 130.

Figure 5:
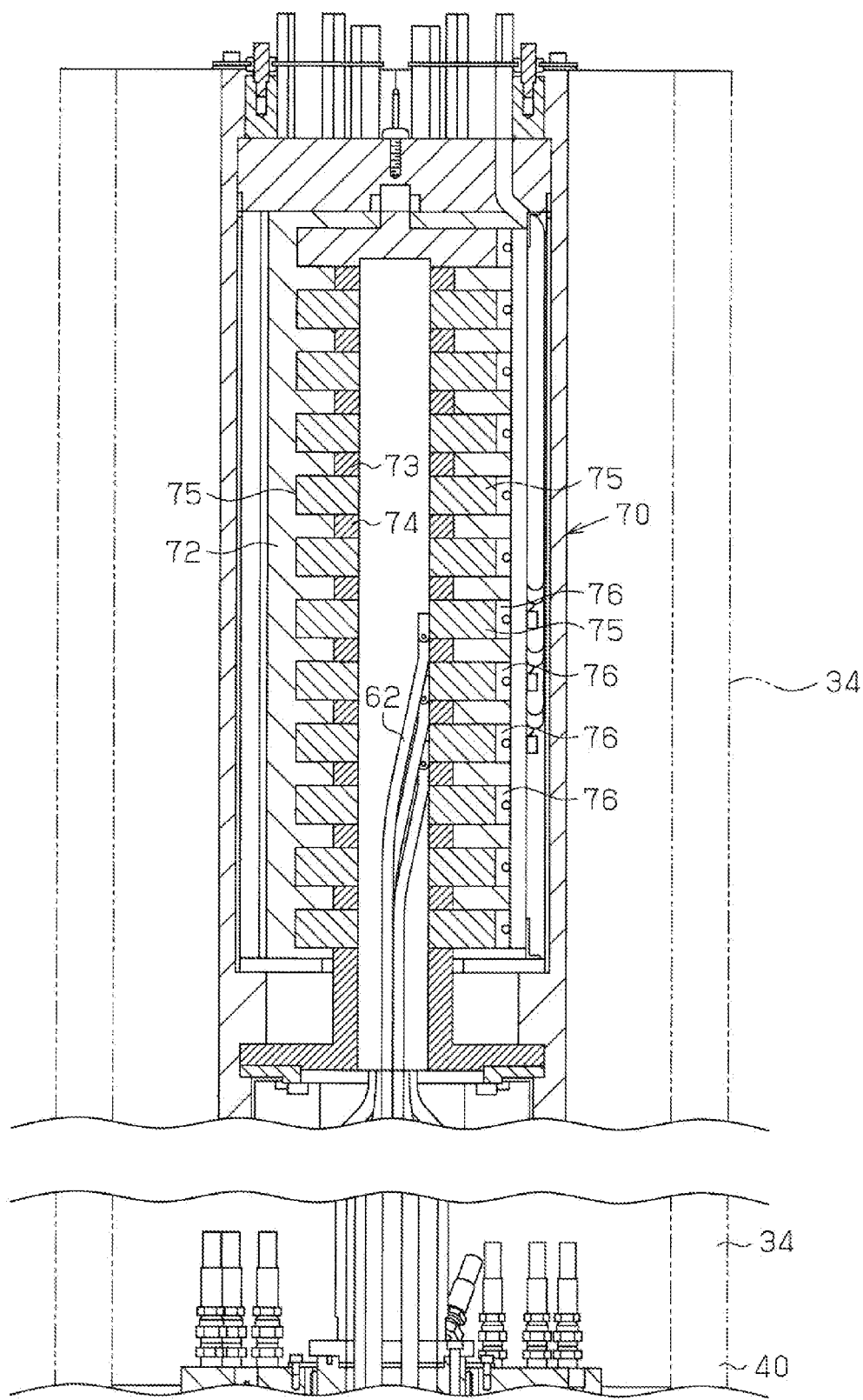
FIG. 5 is a diagram showing the slip ring.

The power wires 62 in the rotation pipe 60 are connected to movable portion 73 of a slip ring 70 stored in the ram 34 as shown in FIG. 5. To facilitate illustration, only part of the power wires are shown in FIG. 5.

As shown in FIG. 5, the slip ring 70 includes a fixed portion 72 fixed to the ram 34 and a movable portion 73 that rotates relative to the fixed portion 72 about the C-axis. The fixed portion 72 has an insulating characteristic, and is formed as a cylinder with a lid. A plurality of feed elements 76 (brushes) are arranged vertically on the fixed portion 72.

The feed elements 76 include feed elements for supplying electricity connected to a power source (not shown), and feed elements for sending control signals. The signal sending feed elements send control signals such as command signals from the control unit 36 to various types of electric devices such as the spindle motor 130 mounted on the spindle head 100 and the B-axis drive motor 156.

The movable portion 73 includes an insulating cylinder 74 and a plurality of conductive contacts 75 extending from the insulating cylinder 74 in the radial direction. The contacts 75 include contacts that electrically contact the feed elements 76 for supplying power and contacts that contact the feed elements 76 for sending control signals. The insulating cylinder 74 is supported by the fixed portion 72 to be pivotable about the C-axis.

The power wires 62 are inserted into the insulating cylinder 74 and are electrically connected to the contacts 75 for supplying electricity. The contacts 75 for supplying electricity are pressed by the feed elements 76 (brushes) for supplying electricity, so as to be electrically connected to the feed elements 76. Although not illustrated, signal lines are also inserted into the insulating cylinder 74, and are electrically connected to the contacts 75 for sending control signals. The contacts 75 for sending control signals are also pressed by the feed elements 76 (brushes) for sending control signals, so as to be electrically connected to the feed elements 76. To facilitate illustration, signal lines are not shown in FIGS. 4 and 5, and only the power wires 62 for supplying electricity are shown.

The slip ring 70 applies electricity and control signals through the power lines 62 and the signal lines to the B-axis drive motor 156, the C-axis drive motor 110, and various types of electric devices in the spindle unit 100. The slip ring 70 allows the spindle unit 100 to rotate by 360 degrees or a greater angle.

Figure 3:
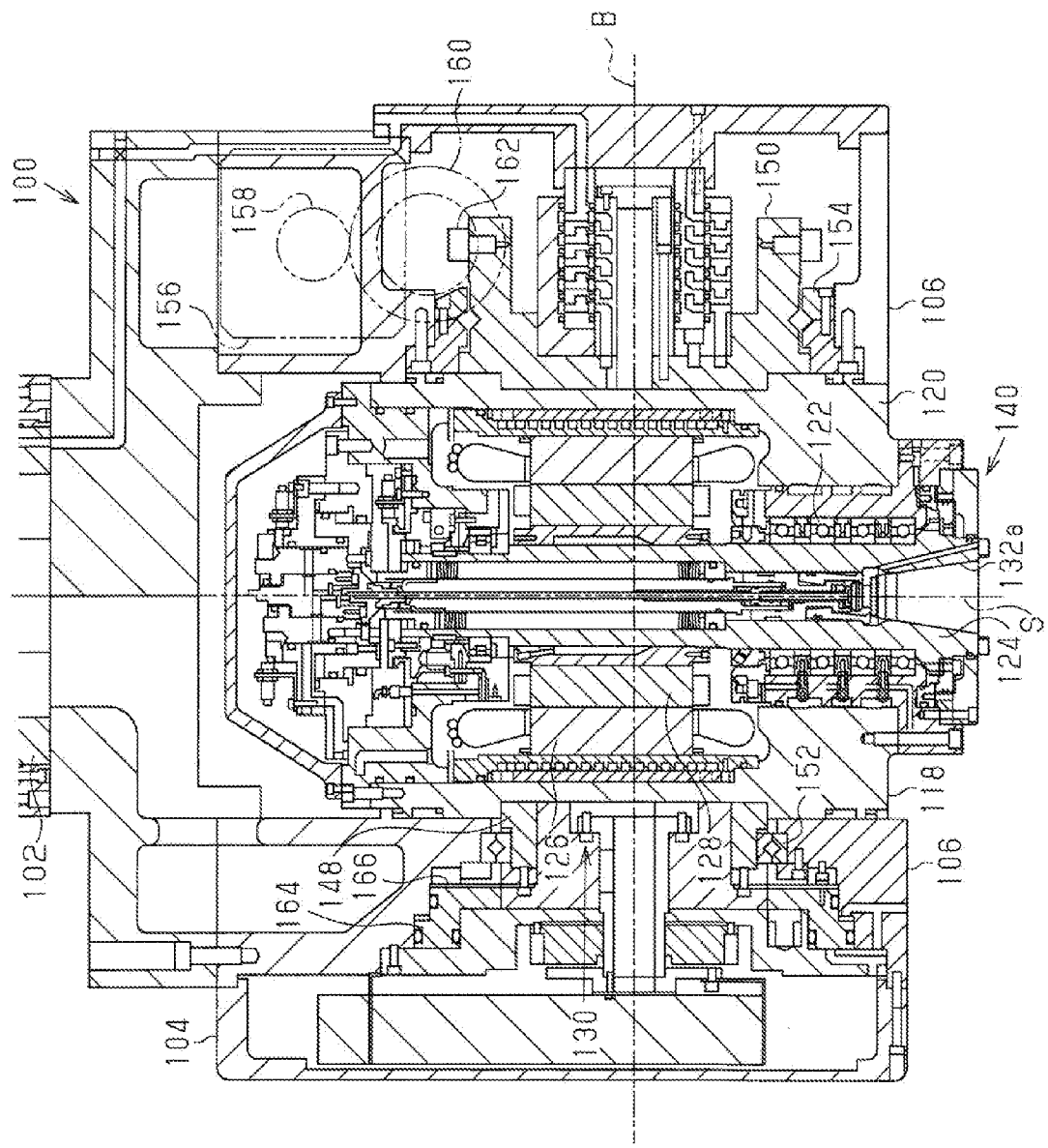
FIG. 3 is a cross-sectional view showing the spindle unit.

As shown in FIG. 3, a pair of fork portions 106 are formed at the lower end of the housing 104 of the spindle unit 100. A spindle head 118 is supported between the fork portions 106 to be rotatable about the B-axis perpendicular to the C-axis.

The spindle head 118 includes a spindle head case 120 and a spindle 124 (main shaft), which is pivotably supported by the spindle head case 120 with a bearing 122. The spindle head case 120 accommodates a spindle motor 130, which includes a stator 126 fixed to the spindle head case 120 and a rotor 128 fixed to the spindle 124. The spindle motor 130 drives the spindle 124 so that the spindle 124 rotates about the axis thereof.

Figure 6:
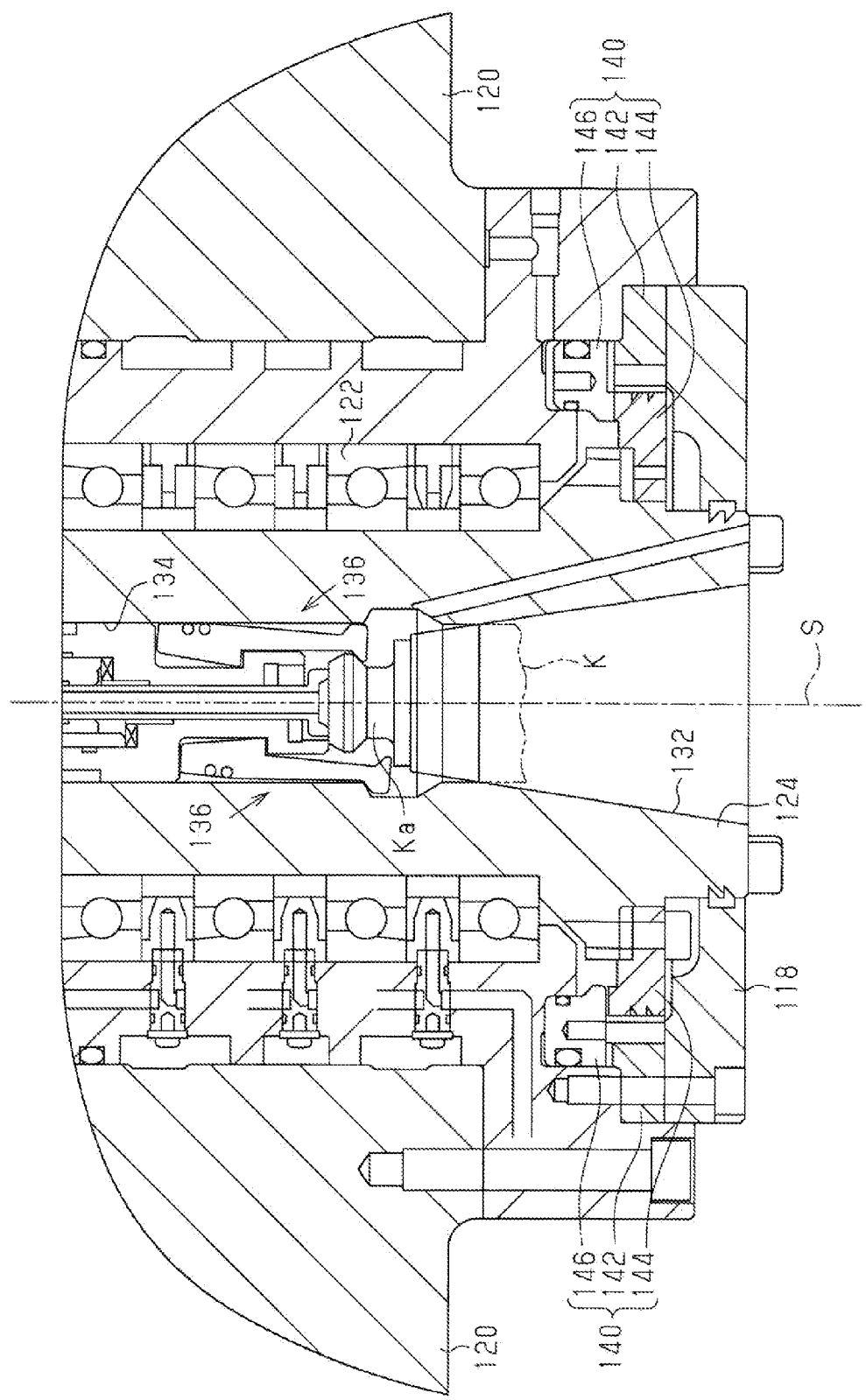
FIG. 6 is an enlarged partial diagram showing the spindle.

As shown in FIG. 6, a spindle tapered portion 132 is formed at the distal end of the spindle 124. A hole 134 extends through the spindle tapered portion 132. A known tool clamp device 136 is provided in the hole 134 to be movable along a spindle axis S. In FIG. 6, for purposes of illustration, the right side of the spindle axis S shows a state where a tool K is attached to the tool clamp device 136, and the left side of the spindle axis S shows a state where the tool K is being attached to or detached from the tool clamp device 136.

A pull stud Ka is provided at the proximal end of the shank of the tool K. The tool clamp device 136 shown on the right side of the spindle axis S pulls and fixes the pull stud Ka of the tool K fitted in the spindle tapered portion 132. The tool clamp device 136 shown on the left side of the spindle axis S allows the pull stud Ka on the shank of the tool K to be detached or attached.

A coupling device 140 is provided at a part of the spindle head case 120 that corresponds to the lower part of the spindle 124. The coupling device 140 includes a fixed coupling 142 fixed to the spindle head case 120, a rotary coupling 144 fixed to the spindle 124, and movable coupling 146. The movable coupling 146 is hydraulically moved toward the fixed coupling 142 to couple the fixed coupling 142 and the rotary coupling 144 to each other.

The fixed coupling 142 is formed as a ring having a large diameter. The rotary coupling 144 has a smaller diameter than the fixed coupling 142 and is coaxial with the fixed coupling 142.

The right side of the spindle axis S shows a state in which the movable coupling 146 couples the fixed coupling 142 and the rotary coupling 144 to each other. In this coupled state, the spindle 124 cannot be pivoted.

When receiving no hydraulic pressure, the movable coupling 146 is disengaged from the fixed coupling 142 by the urging force of a spring (not shown). This allows the spindle 124 to rotate. This state is illustrated on the left side of the spindle axis S in FIG. 6.

As shown in FIG. 3, a pair of coaxial shaft portions 148, 150 project from both sides of the spindle head case 120. The shaft portions 148, 150 are supported to the housing 104 via bearings 152, 154 to be revolved about the B-axis.

The B-axis drive motor 156 is accommodated in the housing 104. A gear 158 is attached to the output shaft of the B-axis drive motor 156. The gear 158 is engaged with a roller gear cam 160 provided nearby. The roller gear cam 160 is engaged with a cam follower 162 attached to the shaft portion 150. When the B-axis drive motor 156 rotates, the spindle head 118 is revolved about the B-axis via the shaft portion 150.

Although not illustrated, the power wires 62 for supplying electricity to the spindle motor 130 and the electric devices accommodated in the spindle head case 120 are drawn into the spindle head case 120 through the shaft portion 148.

A brake piston 164 is arranged in the vicinity of the shaft portion 148 in the housing 104. The brake piston 164 is moved by hydraulic pressure to contact a brake disc 166 attached to the shaft portion 148. By activating the brake piston 164 in this manner, the revolution position of the spindle head 118 is fixed and maintained. When the applied hydraulic pressure is cancelled, the brake piston 164 releases the brake disc 166, thereby allowing the spindle head 118 to revolve.

Figure 7:
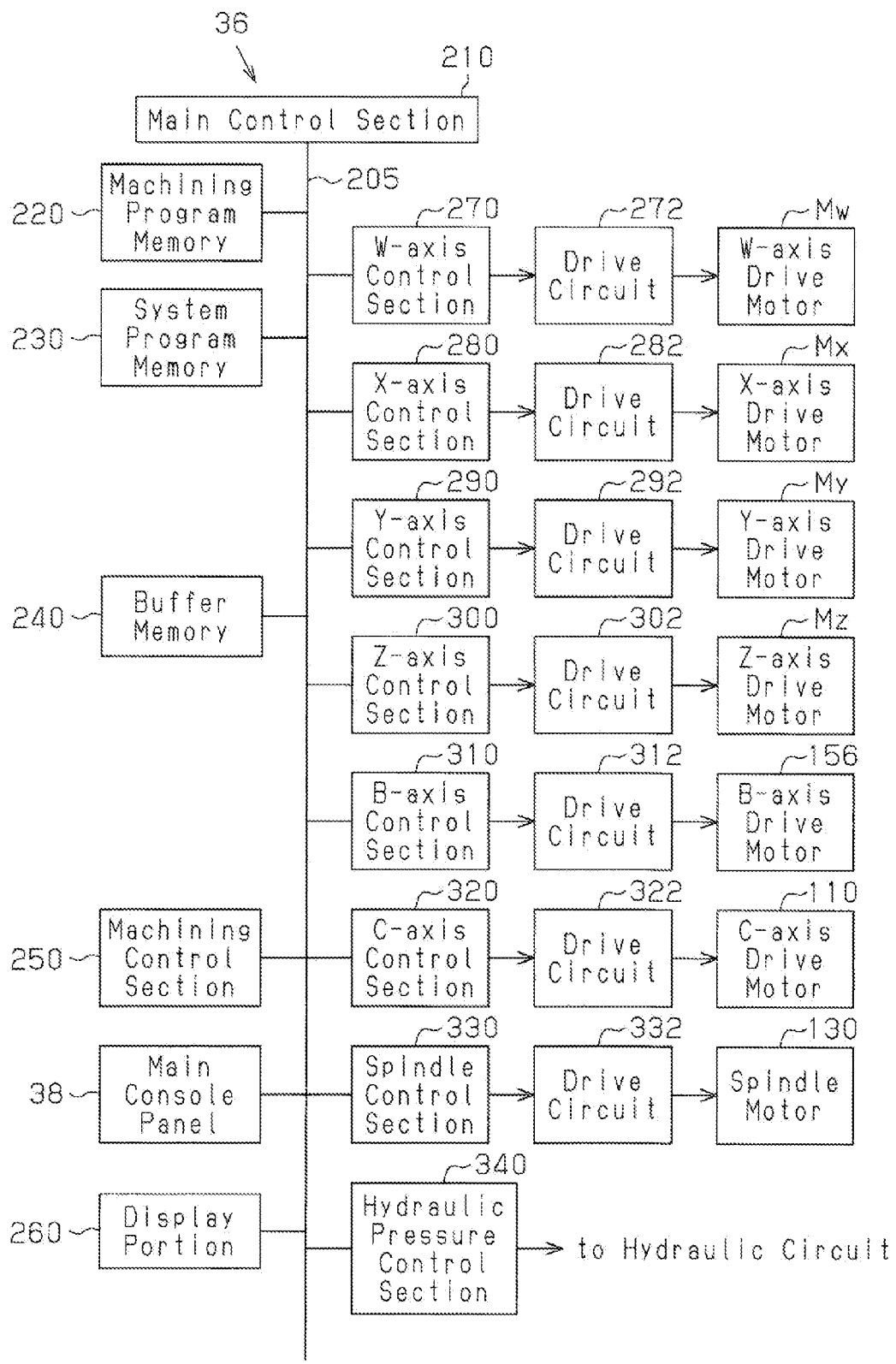
FIG. 7 is an electric block diagram showing the control unit.

As shown in FIG. 7, the control unit 36 has a main control section 210, which is a CPU. The main control section 210 is connected, via a bus line 205, to a machining program memory 220, a system program memory 230, a buffer memory 240, a machining control section 250, a main console panel 38 having a key board, and a display portion 260 having a liquid crystal display.

The main control section 210 is also connected, via the bus line 205, to a W-axis control section 270, an X-axis control section 280, a Y-axis control section 290, a Z-axis control section 300, a B-axis control section 310, a C-axis control section 320, and a spindle control section 330. The W-axis control section 270, the X-axis control section 280, the Y-axis control section 290, the Z-axis control section 300, the B-axis control section 310, and the C-axis control section 320 output movement commands for each axis output from the main control section 210 to drive circuits 272, 282, 292, 302, 312, 322, respectively. Upon receiving the movement commands, the drive circuits drive the motors Mw, Mx, My, Mz, 156, 110 of the axes.

The main control section 210 is further connected, via the bus line 205, to a hydraulic pressure control section 340, which controls a hydraulic circuit for driving devices such as the coupling device 140 and the brake piston 164. The hydraulic pressure control section 340 controls devices such as the coupling device 140 and the brake piston 164.

Upon receiving a rotation command output from the main control section 210, the spindle control section 330 causes the spindle motor 130 of the spindle head 118 to rotate via the drive circuit 332.

A method for boring a hole in a workpiece W using the above described machining center 20 will now be described.

Figure 8:
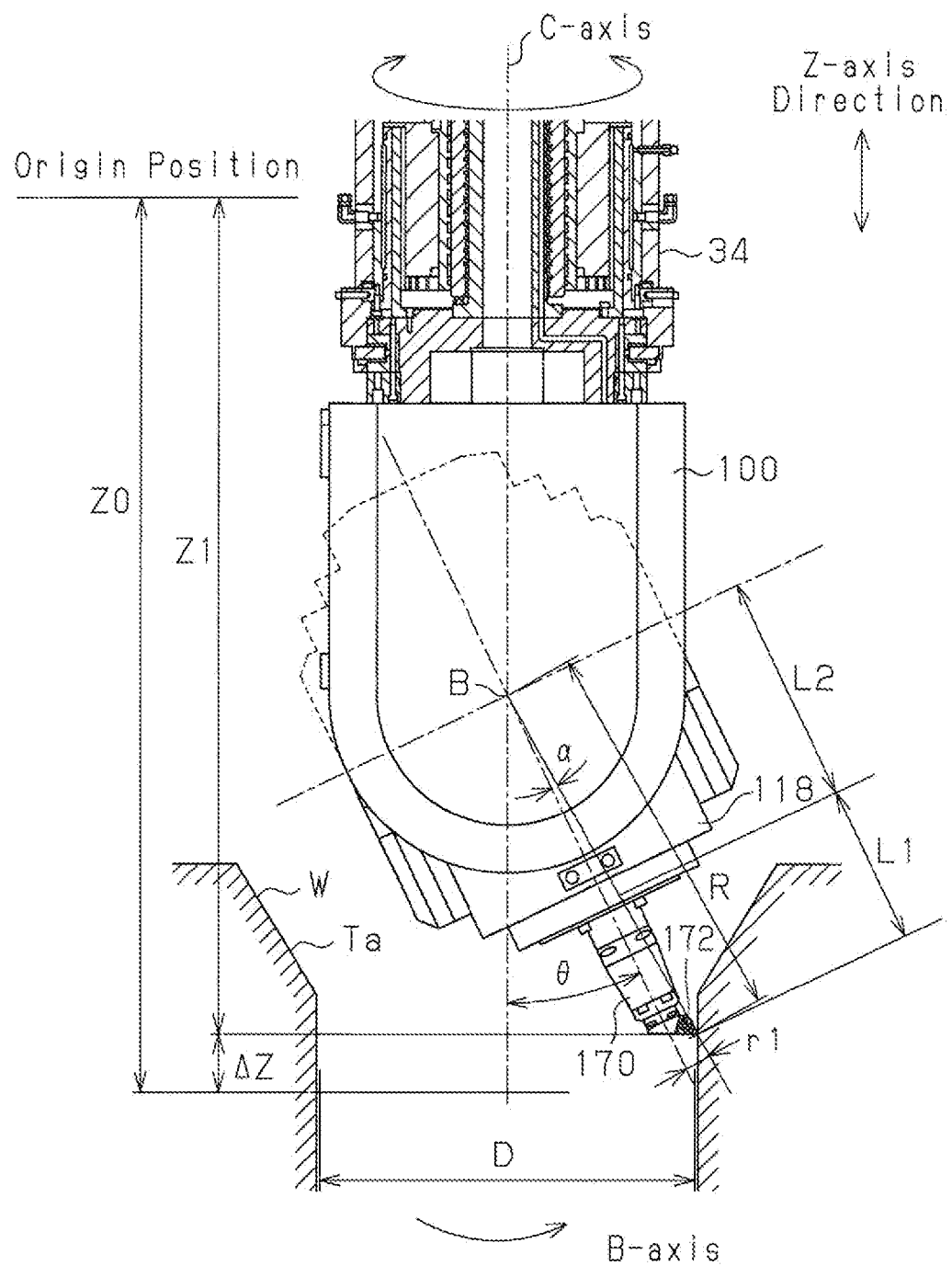
FIG. 8 is a diagram showing operation of the machining center.

To facilitate illustration, FIG. 8 shows a state in which the ATC unit 50 (see FIG. 1) has replaced the tool K by a non-rotational cutting tool 170 having a cutting tip 172. That is, the non-rotational cutting tool 170 is attached to the distal end of the shank of the spindle head 118 as shown in FIG. 8. The non-rotational cutting tool 170 has a pull stud Ka at the proximal end of the shank, as in the case of the tool K shown in FIG. 6. The non-rotational cutting tool 170 is attached to the spindle 124 by clamping the pull stud Ka to the tool clamp device 136. With the non-rotational cutting tool 170 attached, the movable coupling 146 couples the fixed coupling 142 and the rotary coupling 144 to each other, so that the spindle 124 is locked against pivot.

Figure 12:
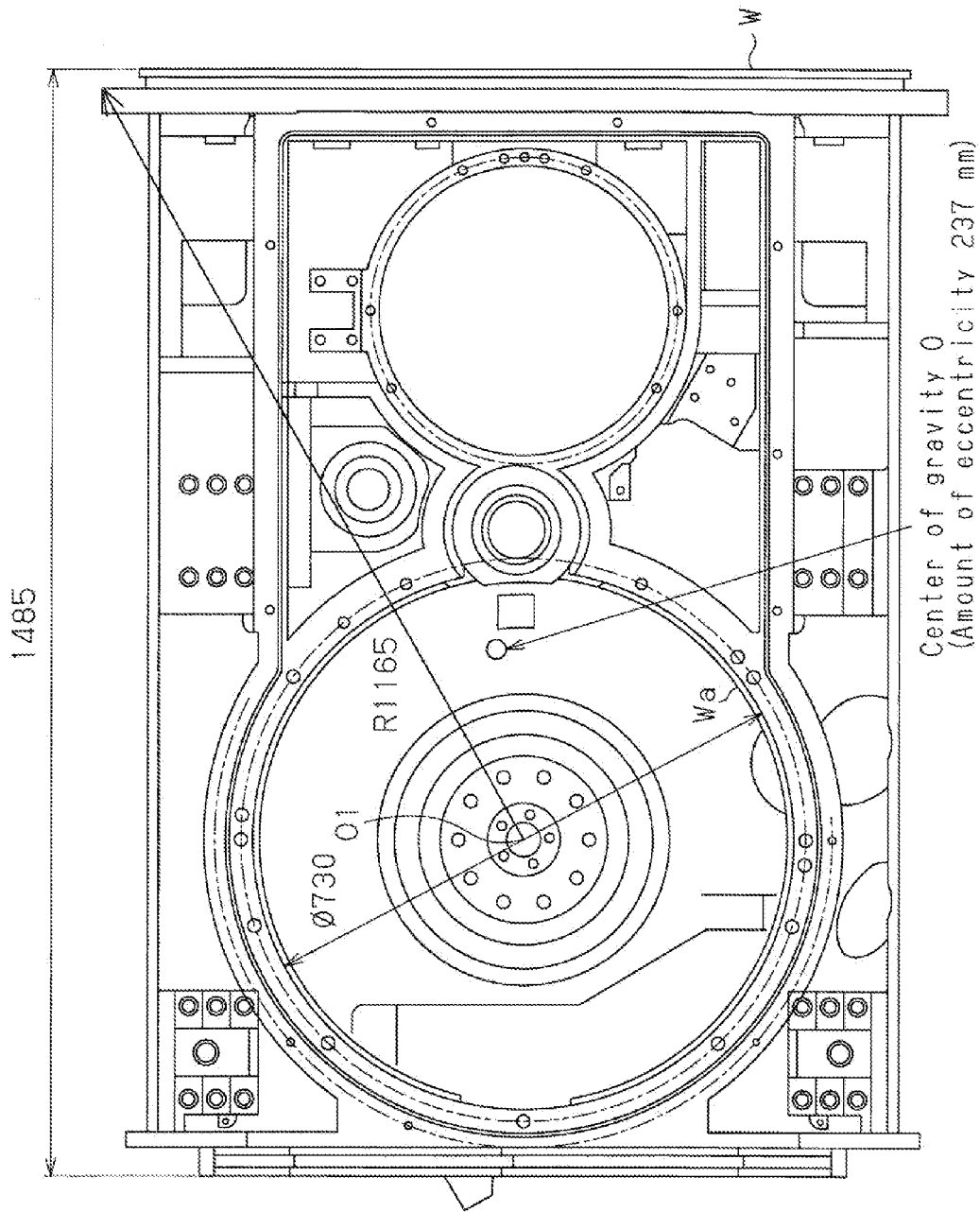
FIG. 12 is a plan view showing a workpiece.
Figure 13:
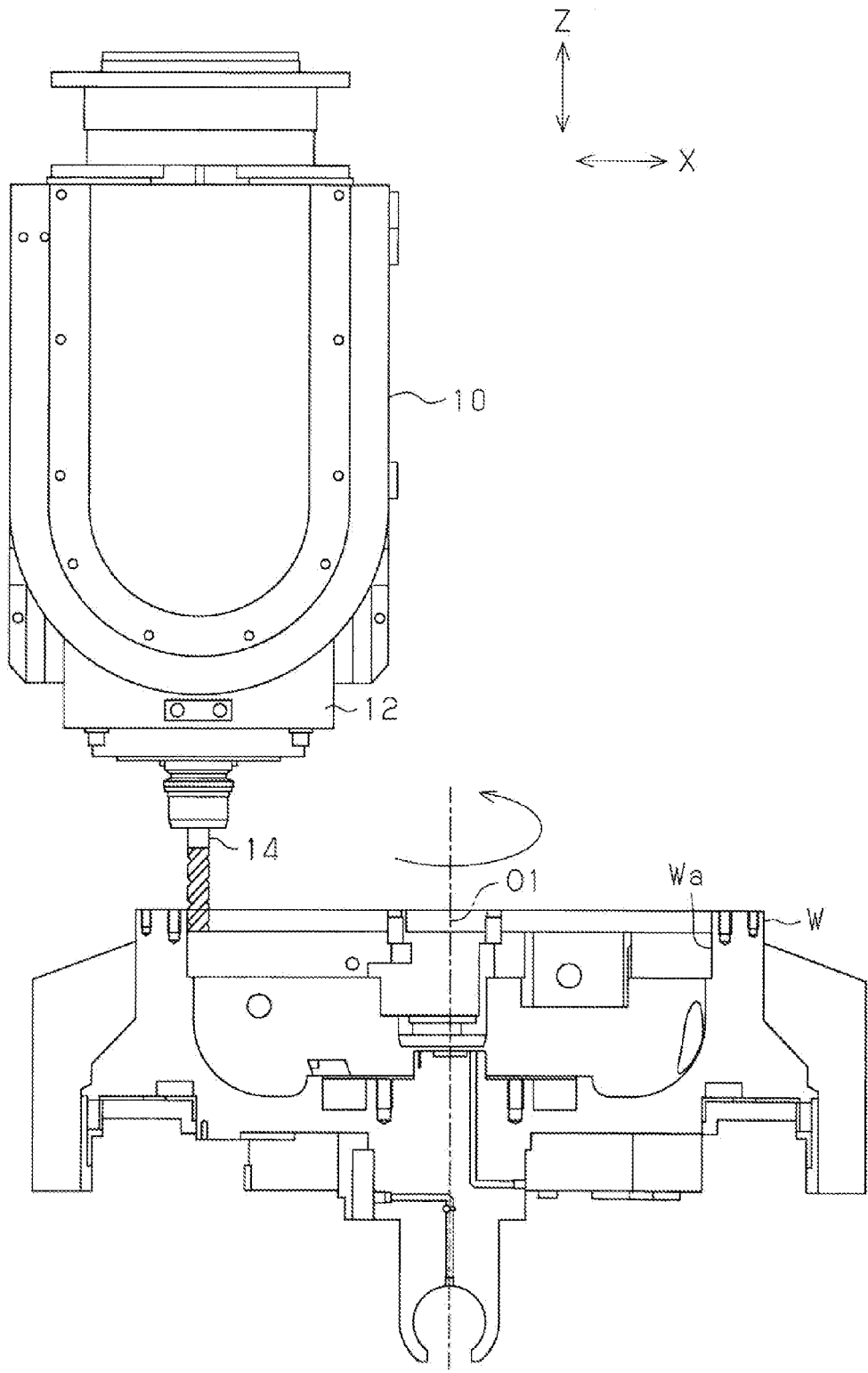
FIG. 13 is a diagram showing a conventional boring operation.

The order of processes for boring described below is executed by the main control section 210 in accordance with the machining program stored in the machining program memory 220. The workpiece W shown in FIG. 8 is fixed onto the table 24. The workpiece W has a center O1 like the workpiece W shown in FIG. 12.

When the X-axis drive motor Mx shown in FIG. 7 is driven and the table 24 starts moving, the center O1 (the center of cutting) of a machining diameter of the workpiece W is set at a predetermined position (step A). The predetermined position is a position to which the ram 34 will be moved to align the C-axis, or the axis of the ram 34, with the center O1.

Then, the Y-axis drive motor My is driven so that the saddle 32 is moved on the cross rail 30 along the Y-axis direction, so that the position on the Y-axis is determined such that the C-axis coincides with the center O1, or the revolution center (step B).

Then, the B-axis drive motor 156 is driven so that the spindle head 118 is pivoted by a predetermined angle about the B-axis. The position of the spindle head 118 is thus determined (step C). The predetermined angle is determined in accordance with a value set by the machining program.

After the spindle head 118 is pivoted, the C-axis drive motor 110 is driven, so that the spindle unit 100 is revolved about the C-axis (step D). In this state, the Z-axis drive motor Mz is driven, so that the ram 34 is moved toward the workpiece W along the Z-axis.

As a result, the non-rotational cutting tool 170 attached to the spindle unit 100 is allowed to bore a hole in the workpiece W on the table 24. Accordingly, the workpiece W can be turned while being fixed onto the table 24. That is, a large workpiece can be machined.

The order of steps is A to C in the above description. However, the order is not limited to this. That is, any two of the steps A, B, and C or all three steps may be performed simultaneously. The order is adequately determined in consideration of interference between the workpiece and the tool In step E of the above description, the ram 34 is moved toward the workpiece W along the Z-axis direction. At this time, the spindle head 118 is pivoted about the B-axis by a predetermined angle. That is, the boring of the workpiece W is performed with the revolution angle maintained. However, in the step E, in which the ram 34 is moved toward the workpiece W along the Z-axis direction according to the machining program, the revolution angle of the spindle head 118 about the B-axis may be changed.

For example, in the example shown in FIG. 8, the hole in the workpiece W has a tapered surface Ta such that the diameter of the hole decreases from the upper surface toward the lower end. The hole has a constant diameter at a lower portion. In this example, the cutting of the tapered surface Ta is performed by changing the revolution angle of the spindle head 118 about the B-axis to gradually reducing the machining diameter while the ram 34 is moved toward the workpiece W along the Z-axis direction. In the lower portion of the hole, the turning is performed while maintaining the revolution angle of the spindle head 118 at a certain value.

Thus, unlike a boring process with a fixed machining diameter, the present embodiment enables forming of holes of different diameters such as tapered holes, by freely changing the machining diameter according to programs.

When forming a hole with a larger diameter at a lower portion than in an upper portion in the workpiece W, it is possible to bore such a hole with the cutting tip 172 under an advantageous condition.

When changing the machining diameter of the workpiece W by rotating (revolving) the spindle head 118 about the B axis while the ram 34 is moved along the Z-axis, the movement amount of the ram 34 along the Z-axis needs to be corrected in accordance with the movement amount of the cutting tip 172 of the non-rotational cutting tool 170 along the Z-axis when the spindle head 118 is rotated about the B-axis.

Specifically, a correction amount related to the movement amount in the Z-axis direction is calculated in the following manner.

The dimensional relationship shown in FIG. 8 leads to expressions (1) and (2). When the B-axis is rotated from a position along the C-axis (or 0-degree position of the B-axis) by an angle θ, the diameter of turning (that is, the machining diameter) is D. The revolution of the B-axis creates a movement amount ΔZ along the Z-axis direction. This movement amount ΔZ needs to be compensated for by using a correction amount. When the B-axis is revolved downward from the position shown in FIG. 8 by the angle θ, the length is extend by the movement amount ΔZ. In FIG. 8, the "origin" is a position that has been adequately set in the ram 34.

The finished dimension D of machining is expressed by the following expression.

$$D = ((L1+L2) \times \sin\theta + r1 \times \cos\theta)2 \quad (1)$$

A blade edge position correction amount ΔA in the Z-axis direction is expressed by the following expression.

$$\Delta Z = Z0 - Z1 = ((L1-L2) \times (1-\cos\theta) + r1 \times \sin\theta) \quad (2)$$

where:
D is the finished dimension of machining;
L1 is the tool length;
L2 is the distance from the B-axis rotation center to the spindle end face;
r1 is the distance from the center of the spindle to the blade edge;
θ is the control angle of the B-axis;
Z0 is the position of the blade edge when the B-axis is at the 0-degree position; and
Z1 is the position of the blade edge after B-axis is revolved.

The main control section 210 combines the correction amount with the movement command in the Z-axis direction, that is, adds or subtracts the correction amount to or from the movement command, and then sends the movement command to the Z-axis control section 300.

From the expression (1), the main control section 210 obtains the value θ, which is a movement command (that is, the angle command value) to be sent to the B-axis control section 310, in accordance with the following expression (3).

$$\theta = -\alpha + \sin^{-1}\frac{D}{2R} \quad (3)$$

where:

$$\sin\alpha = \frac{r1}{R} \quad \cos\alpha = \frac{L1+L2}{R}$$

$$R = \sqrt{(L1+L2)^2 + r1^2}$$

R is the distance from the B-axis rotation center to the blade edge; and

α is the angle defined by the center of the tool and the blade edge.

Based on the value θ, the main control section 210 outputs an angle command value to the B-axis control section 310.

In this manner, when changing the machining diameter of the workpiece W by rotating the spindle head 118 about the B axis while the ram 34 is moved along the Z-axis, the movement amount of the ram 34 along the Z-axis is corrected in accordance with the movement amount of the cutting tip 172 of the non-rotational cutting tool 170 along the Z-axis when the spindle head 118 is rotated about the B-axis. This allows the spindle head 118 to be adequately moved along the Z-axis direction.

Next other embodiments will be described with reference to FIGS. 8 to 11. Like or the same reference numerals are given to those components that are like or the same as the corresponding components of the above embodiment, and detailed explanations are omitted.

Descriptions Will be Given for Different Components.

As shown in FIG. 8, the non-rotational cutting tool 170 is directly attached to the spindle 124 shown in FIG. 6 in the previous embodiment. However, an attachment 350 may be removably attached to the end face of the spindle head 118, and the non-rotational cutting tool 170 may be attached to the attachment 350.

Figure 9A:
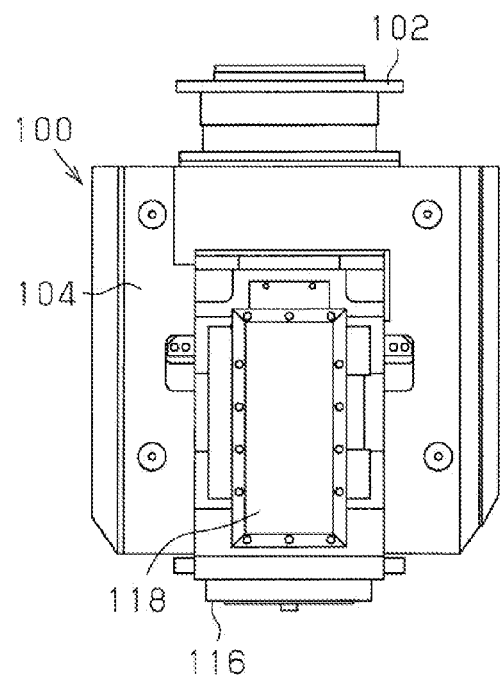
FIG. 9(a) is a front view showing a spindle unit according to another embodiment.
Figure 9B:
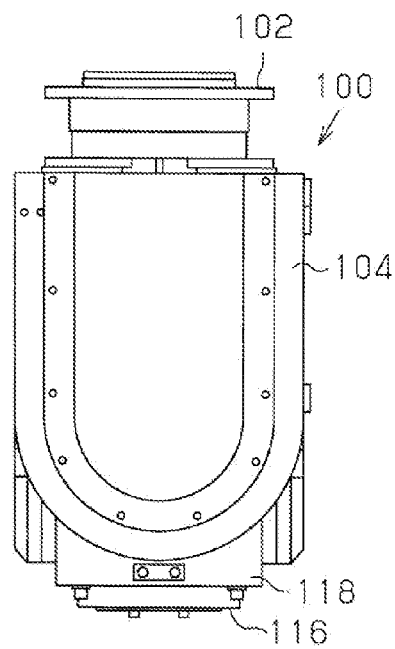
FIG. 9(b) is a side view showing the spindle unit.
Figure 9C:
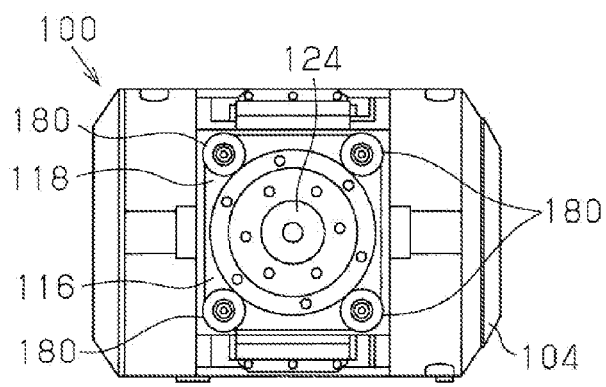
FIG. 9(c) is a bottom view showing the spindle unit.

As shown in FIGS. 9(a) to 9(c), a spindle head 118 has on its end face 116 (that is, on the head end) four clamp devices 180 at four corners about a spindle 124.

On the other hand, as shown in FIGS. 9(a) to 9(c) and FIGS. 10(a) to 10(d), the attachment 350 has an attaching portion 354 shaped as a cuboid with an attachment end face 352 conforming to the shape of the end face of the spindle head 118, and a tool attaching portion 356 shaped as a rectangular tube which is provided on the side opposite to the attachment end face 352 and receives the non-rotational cutting tool 170.

As shown in FIG. 11, the non-rotational cutting tool 170 is fixed to the tool attaching portion 356 such that the axis of the spindle 124 shown in FIG. 6 is parallel to the axis of the non-rotational cutting tool 170 when the attachment 350 is attached to the spindle head 118. As shown in FIG. 11, the tool attaching portion 356 is configured such that the axis of the spindle 124 shown in FIG. 6 is offset by a greater amount from the blade edge of the cutting tip 172 of the non-rotational cutting tool 170 when the attachment 350 is attached to the spindle head 118, than in the previous embodiment. As shown in FIG. 10(a), the embodiment provides four clamp seats 358 at four corners of the attaching end face of the attaching portion 354.

The numbers of the clamp devices 180 and the clamp seats 358 are not limited, but the numbers are preferably plural.

Then, as shown in FIG. 11, the attachment 350 is attached to the spindle head 118 by bringing the attachment end face 352 (see FIG. 10(a)) into contact with the end face 116 of the spindle head 118 (see FIGS. 9(a) to 9(c)), and causing the clamp seats 358 shown in FIG. 10(a) to be clamped by the clamp devices 180 of the spindle head 118. When the clamping by the clamp devices 180 is cancelled, the attachment 350 can be removed from the spindle head 118.

The present embodiment configured as described so far allows boring to be performed to a workpiece W in the same method as in the previous embodiment.

In the case of an attachment head as in the present embodiment, the distance r1 from the center of the spindle 124 (main shaft) to the blade tip of the cutting tip 172, which is expressed in the expressions (1), (2), and (3), is set to a greater value than that in the present embodiment. Thus, changes in the cutting edge angle at the boring operation can be reduced.

In each of the above embodiments, the hydraulic circuit for actuating the coupling device 140 and the brake piston 164 may be replaced by a pneumatic circuit.

In each of the above embodiments, the cross rail 30 is movable along the W-axis direction. However, the cross rail 30 may be immovable along the W-axis direction, and only the ram 34 may be movable along the Z-axis direction relative to the saddle 32.

DESCRIPTION OF THE REFERENCE NUMERALS

24 . . . Table, 28 . . . Column, 30 . . . Cross rail, 32 . . . Saddle 34 . . . Ram, 70 . . . Slip ring, 72 . . . Fixed portion, 75 . . . Contact 76 . . . Feed element, 100 . . . Spindle unit, 118 . . . Spindle head 120 . . . Spindle head case, 170 . . . Non-rotational cutting tool 172 . . . Cutting tip, 350 . . . Attachment

The invention claimed is:

1. A method for boring a hole in a workpiece by a 5-axis machining double-housing machine tool, wherein the machine tool includes:
a table and a double-housing column that are movable relative to each other along an X-axis extending horizontally;
a cross rail that is either fixed on a Z-axis or movable upward and downward along the Z-axis, the Z-axis extending vertically along the column;
a saddle that is movable along a Y-axis extending on the cross rail along a horizontal direction;
a ram supported by the saddle to be movable upward and downward along the Z-axis;
a spindle unit that is attached to a lower end of the ram to be revolvable about a C-axis, which is an axis of the ram;
a spindle head that is attached to the spindle unit to be pivotable about a B-axis, which is perpendicular to the C-axis, the spindle head including a spindle; and
a non-rotational cutting tool removable attached to the spindle;
the method, comprising the steps of:
moving the table in the X-axis direction to set a center of a machining diameter of the hole in the workpiece mounted on the table at a predetermined position;

moving the saddle in the Y-axis direction to coincide the C-axis of the ram with the center of the machining diameter of the hole in the workpiece;

pivoting the spindle head about the B-axis by a predetermined angle to set the position of the spindle head so that the machining diameter of the hole in the workpiece is determined by the position of the spindle head, wherein the predetermined angle is calculated by the following expression, $\theta = -\alpha + \sin^{-1} D/2R$ where:

$\sin \alpha = r1/R$, $\cos \alpha = L1+L2/R$, $R = \sqrt{(L1+L2)^2 + r1^2}$, and wherein $\theta$ is the predetermined angle, D is the machining diameter of the hole, L1 is length of the non-rotational cutting tool, L2 is a distance from the B-axis to an end face of the spindle, r1 is a distance from an axis of the spindle to a blade edge of the non-rotational cutting tool, R is a distance from the B-axis to the blade edge of the non-rotational cutting tool, and α (alpha) is an angle defined by the axis of the spindle and a line, which passes through a pivot point of the spindle head and the blade edge of the non-rotational cutting tool, and revolving the spindle unit about the C-axis and moving the ram toward the workpiece along the Z-axis so that the hole is bored in the workpiece by the non-rotational cutting tool attached to the spindle.

2. The method according to claim 1 further comprising:

changing a pivot angle of the spindle head about the B-axis to change the machining diameter of the hole in the workpiece while the ram is moved toward the workpiece along the Z-axis direction.

3. The method according to claim 2, wherein, when changing the machining diameter of the hole in the workpiece, correcting the movement amount of the ram along the Z-axis direction is performed in accordance with the movement amount of the blade edge of the non-rotational cutting tool along the Z-axis direction when the spindle head is pivoted about the B-axis.

4. The method according to claim 1, wherein any two of the steps of moving the table, moving the saddle, and pivoting the spindle head are performed simultaneously.

5. The method according to claim 1, wherein all three steps of moving the table, moving the saddle, and pivoting the spindle head are performed simultaneously.

* * * * *